United States Patent Office 3,065,039
Patented Nov. 20, 1962

3,065,039
SULFO-METHYLATED PHENOL-FORMALDEHYDE TANNING AGENTS
Ernst Komarek, Leverkusen, and Gustav Mauthe, Opladen, Germany, assignors to Farbenfabriken Bayer Aktiengesellschaft, Leverkusen, Germany, a corporation of Germany
No Drawing. Filed Jan. 21, 1958, Ser. No. 710,185
Claims priority, application Germany Feb. 2, 1957
6 Claims. (Cl. 8—94.24)

The present invention relates to the preparation of synthetic tanning agents consisting of phenol formaldehyde resins which additionally contain sulfo groups.

The manufacture of synthetic tanning agents from phenols, formaldehyde and alkali bisulphites is known and has already been described in patent literature. This method of converting phenols and phenol condensation products into water-soluble synthetic tanning agents, though economic, has some disadvantages which either impair the applicability or quality of the products thus obtainable or require additional working steps such as the removal of appreciable amounts of introduced neutral salts. Another disadvantage is the high consumption of alkali, for example in the sulfo-methylation of dihydroxy-diphenyl sulfone, caused by the poor solubility of this compound in water, on the one hand, and by the slow reactivity of some phenols in the reaction with formaldehyde and bisulfite, on the other hand. Moreover, in the sulfo-methylation of phenols there are formed under hitherto described conditions in most cases also more or less large quantities of monomeric phenolmethane-sulfonic acids which are known not to possess the property of transforming hides into leather. Finally, when working with inexpensive technical phenol-cresol mixtures, the very different reaction rate of the individual components has a very disadvantageous effect in that the slowly reacting portions are condensed only incompletely or not at all.

In order to obviate or reduce the aforesaid disadvantages, the following means have already been used:

Applications of higher temperatures and higher pressures during the process of manufacture.

Application of larger amounts of the alkali acting as a catalyst thus enabling the reaction rate to be substantially increased. A similar effect is obtained by the application of mixtures of alkali metal bisulfite and neutral alkali metal sulfites.

Preliminary condensation of the phenols to form a low molecular weight resin containing methylol groups, which is reacted with alkali metal bisulfite in a second step.

An increase in the reaction rate by raising the temperature above boiling point and increasing the pressure is, however, not satisfactory, since such a process requires pressure-resistant apparatus which are difficult to operate in production and servicing and, therefore, the synthetic tannins produced in this way often are uneven.

The use of larger amounts of alkali has throughout an accelerating effect upon the reaction of phenol and formaldehyde. In the production of synthetic tanning agents from dihydroxy-diphenyl-sulfone, for example, the use of alkali is not only necessary for dissolving the sulfone, but also for accelerating the reaction of this product which reacts only slowly with formaldehyde. When using technical mixtures of phenol and cresol, increasing amounts of the alkali used activate also those portions of the phenol mixture which react barely or only very slowly with formaldehyde, thus increasing the yield of the tanning substance. However, the use of alkali in the production of sulfo-methylated tanning agents results in any case in an accumulation of neutral salts, thus impairing the tanning properties of the products formed which not only results in an appreciable degradation of the quality of the leather, but also limits their applicability on account of their intolerance with vegetable tanning agents. The advantages attained by an increased use of alkali become therefore only effective when the manufacturing process proper of the tanning agent is followed by a further step for removal of the inherent neutral salts. Unless the use of definite quantities of alkali is not altogether necessary for the process of production (for example in the case of sulfo-methylation of dihydroxy-diphenyl-sulfones and in the preliminary condensation of the phenols to form a resin containing methylol groups), the tendency is therefore to keep the alkali content and the neutral salt content resulting therefrom in the manufacture of the tanning agent as low as possible, since the problem of salt removal has hitherto not been satisfactorily solved. The process of de-salting not only requires an additional working step, but involves also a loss of material on account of the tanning portions remaining in the mother liquor.

In the manufacture of sulfomethylated tannins by the two-step process wherein the first step the condensation of phenols with formaldehyde is carried out in an alkaline medium and in the second step the preliminary condensation product is dissolved with sodium bisulfite, the removal of the alkali is expediently effected by precipitation of the preliminary condensaton product with acid. The neutral salt thus formed remains nearly quantitatively in the mother liquor and the loss of organic substance is relatively small on account of the poor solubliity of the condensation product.

It has now been found that by a modification of the process it is possible to obviate all the aforesaid disadvantages and at the same time to improve essentially the tanning properites of the products thus obtained without requiring additional working steps or giving rise to loss of material.

According to the process of the invention, the phenols are reacted with formaldehyde in an alkaline medium whereby the amounts of alkali may be varied within wide limits. The amount of alkali added may be equivalent to the amount of bisulfite required for converting the preliminary condensation product into the water-soluble tannin. By this high alkali addition in the first condensation step there is attained a uniform condensation even of phenols having a very different reaction speed. Instead of the alkali bisulfite hitherto used for solubilizing in the second condensation step, according to the invention sulfur dioxide is introduced into the alkali-containing preliminary condensation product, until a permanent neutral reaction is obtained. In this manner the whole of the alkali is contained in the reaction product of the invention and does not occur in the tanning agent as a neutral salt. In addition to an essential improvement in the quality of the tanning agent produced, this means a saving of alkali and acid. By modification of the process of manufacture according to the invention it is possible to carry out the first condensation step, namely the production of the resin containing methylol groups, within a short period of time and, surprisingly, also to shorten essentially the incorporation by condensation of the solubilizing group in the second condensation step.

In the manufacture of the tanning agents according to the herein described process all monovalent and bivalent phenols as well as mixtures of phenols may be used which have been described in the prior art processes of producing sulfomethylated tanning agents, e.g. phenol, cresols, dihydroxy diphenyl, sulfones, dihydroxy diphenyl, dimethylmethane, pyrocatechol, as well as technical crude cresols (i.e. mixtures of varying proportions of phenols and isomeric cresols), and empyreumatic oil (i.e. mixtures of pyrocatechol and homopyrocatechol).

Reaction of phenols with formaldehyde to form low molecular weight resins containing methylol groups is influenced by the amount of formaldehyde applied, the temperature and duration of condensation. Therefore, the optimum condensation conditions have to be determined for any specific type of phenol or phenol mixture in any given case. In general, it is preferable to carry out the reaction at the boiling temperature of the condensation mixture. The condensation time depends on the amount of the alkali acting as catalyst and on the condensation activity of the phenol used. For instance the reaction of dihydroxy diphenyl sulfone and formaldehyde requires several hours, while m-cresol is reacted within a few minutes at 98° C.

Alkali accelerating the reaction is used in the process of the invention in such an amount that sodium bisulfite is formed by subsequently blowing or pouring in sulfur dioxide in the very amount which is required to solubilize the resin composed of phenol and formaldehyde. This amount mainly depends on the phenol or phenol mixture used, as well as on the properties of the resin, and preferably amounts to a ⅕ to a ½ mol of alkali per each mol of the phenol present in the reaction.

A surprising feature of the process of invention is the extraordinarily fast progress of the two reactions occurring in rapid succession, namely the formation of the resin containing methylol groups from phenols of formaldehyde, as well as the further reaction with sulfur dioxide. For instance the manufacture of the tanning agent from crude cresol by the herein described process only requires 45 minutes, the two processes occurring in succession proceeding in exothermic reaction without heat supply.

To show the utility of the inventive compounds leather has been prepared as follows with them:

100 parts by weight of sheep or goat pelt are drummed with 150 parts by weight of water and 5% of the product described in Example 1. After drumming for 3 hours the pelts are finally tanned in the same bath with 15% of pretannin of a mixture of quebracho and mimosa (1:1). The lining leather thus tanned is finished as usual. The leather is distinguished by a very light and even color and good fullness.

Another example for the utility of the inventive compounds is the following example:

100 parts by weight of cow hide which was prepared in the usual manner in the beam house for the manufacture of sole leather are pretanned in the drum with 200 parts by weight of water and 5 parts by weight of the product described in the foregoing example. The leather thus pretanned within 3 hours is finally tanned in another drum in the usual manner with a mixture of vegetable tannins and synthetic tanning agents and thereafter finished as usual. The leather obtained is distinguished by a light color and firmness and fineness of the grain. The danger of a drawn grain due to drumming occurring in the final tanning process with vegetable tannis is minimized by the aforesaid pretannage; besides, penetration of the tannin is promoted. Another advantage of pretanning with the afore described product is that the final tanning process can be started in concentrated liquors so that tanning times are essentially shortened.

Still another example to show how leather may be prepared with the inventive compounds is the following example:

100 parts by weight of calf pelt are tanned in the drum after the usual treatment in the beam house with 200 parts by weight of water and 35 parts by weight of the lightfast alum tanning agent described in Example 2. The tanning agent is added in 5 portions at intervals of 8 hours. Tanning totally requires 3 days. The finally tanned leather is fat-liquored as usual with a fat-liquoring agent which is fast to light and then finished.

The white leather thus obtained is distinguished by good fullness, mellow and supple handle and fine properties of the grain. Besides, the leather is extraordinarily fast to light.

Leather may also be prepared with the inventive compounds as follows:

100 parts by weight of neutralized chrome-tanned cow hide are aftertreated in the drum with 200 parts by weight of water and 12 parts by weight of the product described in the foregoing example. The product is added in 3 portions at intervals of 30 minutes. Pretanning totally requires 4 hours. The leather aftertreated with the alum tanning agent is fat-liquored in the usual manner with a fat-liquoring agent which is fast to light.

The bleached chrome-leather thus obtained shows a good fullness and a very light and even color. The grain of the leather is fine. The bleached leather shows an excellent fastness to light.

The inventive compounds may be prepared as shown in the following examples. It has to be understood however that the present invention should not be restricted thereto.

*Example 1*

150 parts by weight of crude cresol and 50 parts by weight of phenol are treated with 112 parts by weight of a 50% sodium hydroxide solution, and 245 parts by volume of a 30% formaldehyde solution are added with stirring. The reaction mixture is brought to a temperature of about 70° C. and kept at this temperature for 3 hours. Thereupon, sulfur dioxide is blown into the preliminary condensation product, until it shows neutral reaction. The temperature thereby rises to the boiling point of the mixture. The pH-value which rises during the condensation is brought to 6–7 by further introduction of sulfur dioxide. After about 1 hour the product dissolves clearly in dilute acid. The tanning agent adjusted with acetic acid yields pure white, soft and full leathers. A product with same properties may be obtained exactly according to the above described method but using instead of the above said mixture of crude cresol and phenol 195 parts of pure phenol.

*Example 2*

250 parts by weight of dihydroxydiphenyl-sulfone are treated with 250 parts by weight of water and dissolved hot by the addition of 100 parts by weight of 50% sodium hydroxide solution. 130 parts by volume of formaldehyde (30%) are introduced with stirring and the reaction mixture is boiled under reflux for 3 hours. Sulfur dioxide is then blown in until the reaction mixture is neutral, and this process is continued, until the condensation product shows a permanent neutral reaction. After a condensation of 2 hours, the product dissolves clearly in dilute acids. The condensation product rendered acid with acetic acid, yields a white tanning agent producing full leathers of extreme fastness to light.

*Example 3*

200 parts by weight of crude cresol are treated with 52 parts by weight of solid sodium hydroxide, and 200 parts by volume of a 37% formaldehyde solution are slowly introduced with stirring into the mixture. The condensation is effected at a temperature of 85° C. within 3 hours. Thereupon, sulfur dioxide is blown into the preliminary condensation product thus obtained, until the neutral reaction remains permanent. The sulfitation process is carried out at a temperature of 95° C. and is completed after 1 hour. During the sulfitation process water is evaporated under a slight vacuum. After the addition of a solid dicarboxylic acid such as adipic acid and cooling, a solid tanning agent is obtained having good tanning properties.

Example 4

200 parts by weight of crude cresol and 200 parts by volume of water are treated with 110 parts by volume of 30% formaldehyde and 5 parts by volume of 20% hydrochloric acid and boiled under reflux for 3 hours. Into the cooled resin 90 parts by weight of 50% sodium hydroxide solution are introduced, another 150 parts by volume of formaldehyde are added and the mixture is condensed at 75° C. for 1 hour. Into the condensation product thus obtained sulfur dioxide is introduced, as described in the preceding examples, until the product shows neutral reaction, and the sulfitation process is carried out at 85° C. After a condensation period of 2 hours, the reaction product is clearly soluble in dilute acid. After acidification with acetic acid, a tanning agent is obtained, which yields white very full leathers.

We claim:

1. As a new tanning agent, a sulfo-methylated phenol-formaldehyde condensate prepared by condensing a phenolic monomer with formaldehyde in the presence of one-fifth to one-half mol of an alkali metal hydroxide per mol of the phenolic monomer until a partially condensed resin is formed, neutralizing the alkali with sulfur dioxide and continuing condensation in a neutral to weakly acid medium until a water-soluble resin is formed, whereby the whole of the alkali is contained in the reaction product and does not occur in the resin as a neutral salt.

2. Product of claim 1 wherein the formaldehyde is reacted with phenol.

3. Product of claim 1 wherein the phenolic monomer is technical grade cresol.

4. Product of claim 1 wherein the phenol is dihydroxy-diphenyl-sulfone.

5. Product of claim 1 wherein the phenolic monomer is a mixture of commercial grade cresol and phenol.

6. As a novel tanning agent, a sulfo-methylated phenol-formaldehyde condensate prepared by condensing a phenolic monomer with formaldehyde in the presence of one-fifth to one-half mol of an alkali metal hydroxide per mol of the phenolic monomer until an alkali-containing partially condensed phenol-formaldehyde resin is formed, neutralizing the alkali with sulfur dioxide, whereby the whole of the alkali is contained in the resin and does not occur in the final product as a neutral salt, and then completing the condensation in a neutral to weakly acid medium until water solubility is attained.

References Cited in the file of this patent

UNITED STATES PATENTS

| | | |
|---|---|---|
| 2,177,420 | Noerr et al. | Oct. 24, 1939 |
| 2,321,451 | Bauer | June 8, 1943 |
| 2,357,798 | Niederhauser et al. | Sept. 12, 1944 |
| 2,621,164 | Nagy | Dec. 9, 1952 |
| 2,716,098 | Biedermann | Aug. 23, 1955 |

FOREIGN PATENTS

| | | |
|---|---|---|
| 474,361 | Great Britain | Oct. 25, 1937 |